(12) United States Patent
Park

(10) Patent No.: US 10,299,084 B1
(45) Date of Patent: May 21, 2019

(54) SYSTEMS AND METHODS FOR PROVIDING GROUP CALL SERVICE AREAS

(71) Applicant: Sprint Spectrum LP, Overland Park, KS (US)

(72) Inventor: Sunyong Park, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/726,349

(22) Filed: Oct. 5, 2017

(51) Int. Cl.
*H04W 4/08* (2009.01)
*H04W 76/34* (2018.01)
*H04W 76/40* (2018.01)
*H04W 4/021* (2018.01)
*H04M 3/56* (2006.01)
*H04W 68/00* (2009.01)

(52) U.S. Cl.
CPC .............. *H04W 4/08* (2013.01); *H04M 3/56* (2013.01); *H04W 4/021* (2013.01); *H04W 68/005* (2013.01); *H04W 76/34* (2018.02); *H04W 76/40* (2018.02); *H04M 2203/5009* (2013.01); *H04M 2203/5027* (2013.01)

(58) Field of Classification Search
CPC ..... H04W 4/08; H04W 76/40; H04W 68/005; H04W 4/021; H04M 3/56; H04M 2203/5009; H04M 2203/5027
USPC ........................................................ 455/416
See application file for complete search history.

(56) References Cited

U.S. PATENT DOCUMENTS

| | | | |
|---|---|---|---|
| 2006/0285649 A1* | 12/2006 | Qian | H04L 63/00 379/32.01 |
| 2009/0034473 A1* | 2/2009 | Shimobayashi | H04W 36/18 370/331 |
| 2009/0092116 A1* | 4/2009 | Jiang | H04W 84/08 370/340 |
| 2011/0047011 A1* | 2/2011 | Tirpak | G06Q 30/02 705/14.1 |
| 2013/0064160 A1* | 3/2013 | Newberg | H04W 76/40 370/312 |
| 2013/0136049 A1 | 5/2013 | Song et al. | |
| 2014/0064177 A1* | 3/2014 | Anchan | H04W 4/08 370/312 |
| 2015/0079979 A1 | 3/2015 | Anchan | |
| 2015/0257151 A1 | 9/2015 | Lin | |
| 2016/0007316 A1* | 1/2016 | Vaidya | H04W 68/02 370/312 |
| 2016/0374116 A1* | 12/2016 | Sexton | H03M 7/30 |
| 2017/0178630 A1* | 6/2017 | Gummadi | G10L 15/26 |
| 2017/0310718 A1* | 10/2017 | Kim | H04L 65/4076 |
| 2018/0103364 A1* | 4/2018 | Gholmieh | H04W 8/005 |
| 2018/0176979 A1* | 6/2018 | Ryu | H04W 76/28 |

* cited by examiner

*Primary Examiner* — Inder P Mehra

(57) ABSTRACT

Systems and methods are described for providing group call service areas. It may be detected at a wireless device that participation in a group call with a first group call identification is available, wherein the detecting is based on entry into a service area for the group call. The wireless device may be automatically registered to join the group call. A user of the wireless device may be notified that participation in the group call is available. The wireless device may join the group call after receiving an indication from the user, wherein joining the group call includes receiving downlink group call voice data from an access node in communication with the wireless device.

17 Claims, 14 Drawing Sheets

SYSTEMS AND METHODS FOR PROVIDING GROUP CALL SERVICE AREAS

TECHNICAL BACKGROUND

Telecommunication systems, such as cellular networks or other wireless networks, rely on multiple network elements to provide reliable services for a plurality of wireless device. In some circumstances, it may be beneficial to provide a group call service such that a number of participants may be included on the call. Such a configuration may be practical in a professional setting, for planning purposes where a number of individuals are expected to participate on a call, or in other suitable circumstances. Systems that consider efficient resource usage when managing group call participation when group calling is available may provide enhanced services to users.

Overview

Systems and methods are described for providing group call service areas. It may be detected at a wireless device that participation in a group call with a first group call identification is available, wherein the detecting is based on entry into a service area for the group call. The wireless device may be automatically registered to join the group call. A user of the wireless device may be notified that participation in the group call is available. The wireless device may join the group call after receiving an indication from the user, wherein joining the group call includes receiving downlink group call voice data from an access node in communication with the wireless device.

DETAILED DESCRIPTION

In an embodiment, a group call may be established for a plurality of participant wireless devices. For example, a group call may be beneficial to organizations that seek a plurality of wireless devices participants, the ability to provide input for a number of the wireless device participants, and the ability to actively listen for a number of the wireless device participants.

In an embodiment, a wireless device may enter a service area, such as a geographic area, that is performing a group call. Efficient techniques for notifying the wireless device and adding the wireless device to the group call can provide beneficial value to users of the system. In some embodiments, a wireless device may automatically detect the availability of group call participation, and subsequently join such a group call upon input from the user of the wireless device.

Figure 1:
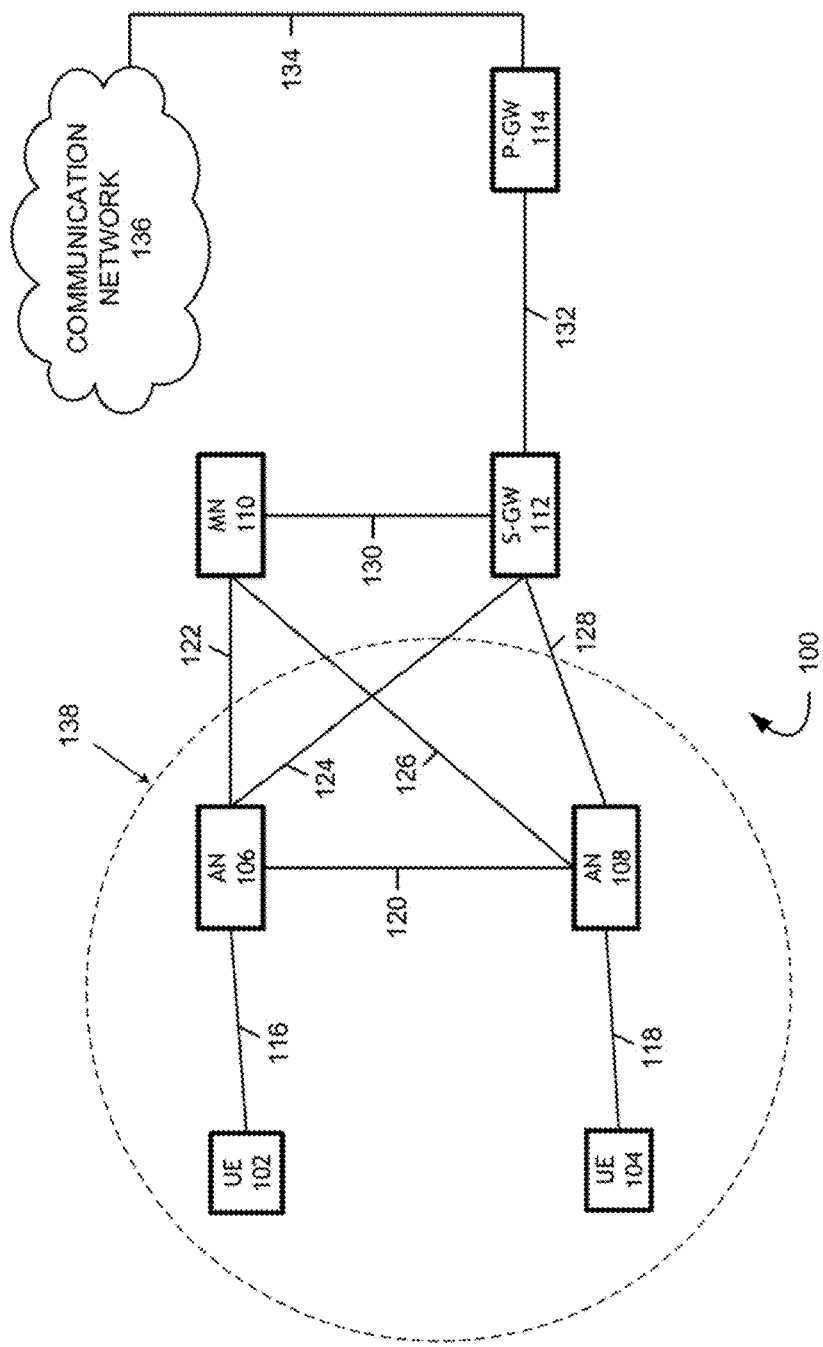
FIG. 1 illustrates an exemplary communication system to provide a group call service area.

FIG. 1 illustrates an exemplary communication system 100 to provide a service area for a group call comprising wireless devices 102 and 104, access nodes 106 and 108, management node 110, gateway nodes 112 and 114, and communication links 116, 118, 120, 124, 126, 128, 130, 132, and 134, communication network 136, and service area 138. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access nodes 106 and 108, management node 110, and gateway nodes 112 and 114 which are omitted for clarity, including additional processing nodes, routers, gateways, and physical and/or wireless data links for carrying data among the various network elements.

Wireless devices 102 and 104 can be any device configured to communicate over communication system 100 using a wireless communication link. For example, wireless devices 102 and 104 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with the depicted access nodes, any number of wireless devices can be implemented.

Access nodes 106 and 108 are network nodes capable of providing wireless communications to wireless device 102, and can be, for example, a base transceiver station, a radio base station, a small cell (e.g., picocell, femtocell, and the like), and an eNodeB device. Although only two access nodes are illustrated in FIG. 1, wireless devices 102 and 104 (and other wireless device not depicted) can be in communication with a plurality of access nodes and/or small cells. The plurality of access nodes and/or small cells can be associated with different networks and can support different communication protocols and radio access technologies.

Management node 110 can comprise a processor and associated circuitry to execute or direct the execution of computer-readable instructions to obtain information. Management node 110 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Management node 110 can receive instructions and other input at a user interface. Management node 110 can comprise a processor and associated circuitry to execute or direct the execution of computer-readable instructions to obtain information. In an embodiment, management node 110 can comprise a mobility management entity (MME) node.

Gateway nodes 112 and 114 are network elements which can comprise a processor and associated circuitry to execute or direct the execution of computer-readable instructions. Gateway node 112 and 114 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway nodes 112 and 114 can provide instructions to access nodes 106 and 108 related to channel selection in communications with wireless devices 102 and 104. In some embodiments, gateway nodes 112 and 114 may comprise a single node. Gateway nodes 112 and 114 can comprise at least one of a serving gateway (SGW), a packet data network gateway (PDNGW), a cellular gateway (CGW), and a combination thereof.

Communication network 136 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 136 can be capable of carrying voice information and other information, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 136 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or some other type of communication equipment, and combinations thereof.

Communication links 116, 118, 120, 124, 126, 128, 130, 132, and 134 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

In operation, access node 106 may establish communication with wireless device 102 such that access node 106 provides the wireless device access to a communication network (e.g., communication network 136) and access node 108 may establish communication with wireless device 104 such that access node 108 provides the wireless device access to a communication network (e.g., communication network 136). In an embodiment, system 100 may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, a group call may be established for a plurality of participant wireless devices. For example, a group call may be beneficial to organizations that seek a plurality of wireless devices participants, the ability to provide input for a number of the wireless device participants, and the ability to actively listen for a number of the wireless device participants. Some implementation of group calling may be inefficient. For example, downlink data on a group call is often the same for the listening participants. Accordingly, a degree multicasting may be leveraged to enhance efficiency. Further, a plurality of access nodes may each include a plurality of wireless device participants. For example, access node 106 may be in communication with a plurality of wireless devices that comprise group call participants and access node 108 may be in communication with a plurality of wireless devices that comprise group call participants. Here, multicasting to each access node that includes a participant may further provide efficiency with regard to link resources.

In an embodiment, group calls may be associated with particular service areas. For example, a group call established with reference to system 100 may comprise a service area 138. The service area may comprise a signal area for the access nodes participating in the group call (e.g., access nodes 106 and 108) a geographic area, a predetermined location, such as a building, stadium, college campus, and the like. Here, providing group calls within a service area and notifying relevant wireless devices may benefit users of the system.

Figure 2:
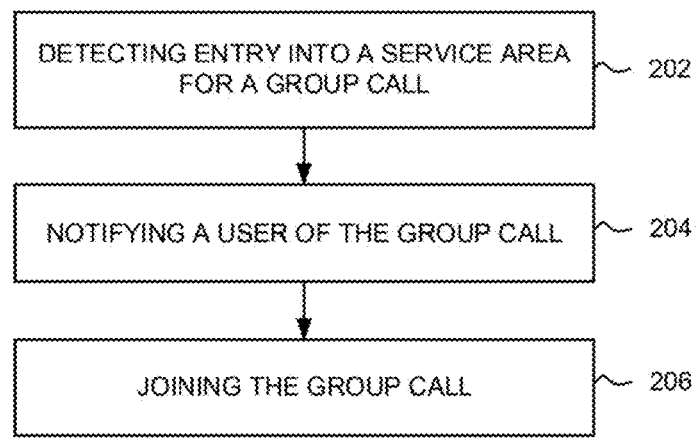
FIG. 2 illustrates an exemplary method for providing a group call service area.

FIG. 2 illustrates an exemplary method providing a service area for a group call according to an embodiment. The method will be discussed with reference to the exemplary communication system 100 illustrated in FIG. 1, however, the method can be implemented with any suitable communication system.

Referring to FIG. 2, at step 202, it is detected at a wireless device that participation in a group call with a first group call identification is available, wherein the detecting is based on entry into a service area for the group call. For example, wireless device 102 may enter into service area 138, wherein the entry allows wireless device 102 to participate in an established group call associated with service area 138.

At step 204, the user of the wireless device is notified that participation in the group call is available. For example, wireless device 102 may be registered to join the group call, the user of the wireless device may be notified (e.g., using a display on a screen of the wireless device) that participation on the group call is available.

In an embodiment, the wireless device is automatically registered for the established group call. For example, wireless device 102 automatically transmits a group call registration request to access node 106, and the access node transmits the group call registration request to the core network (e.g., management node 110, gateway nodes 112 and 114, and the like).

At step 206, the wireless device may join the group call after receiving an indication from the user, wherein joining the group call includes receiving downlink group call voice data from an access node in communication with the wireless device. For example, the user of wireless device 102 may provide an indication that instructs the wireless device to join the group call (e.g., clicking/pressing a join button displayed on the display of the wireless device). In an embodiment, joining the group call comprises receiving downlink group call voice data from access node 106 using one or more bearers established for carrying group call data.

Figure 3:
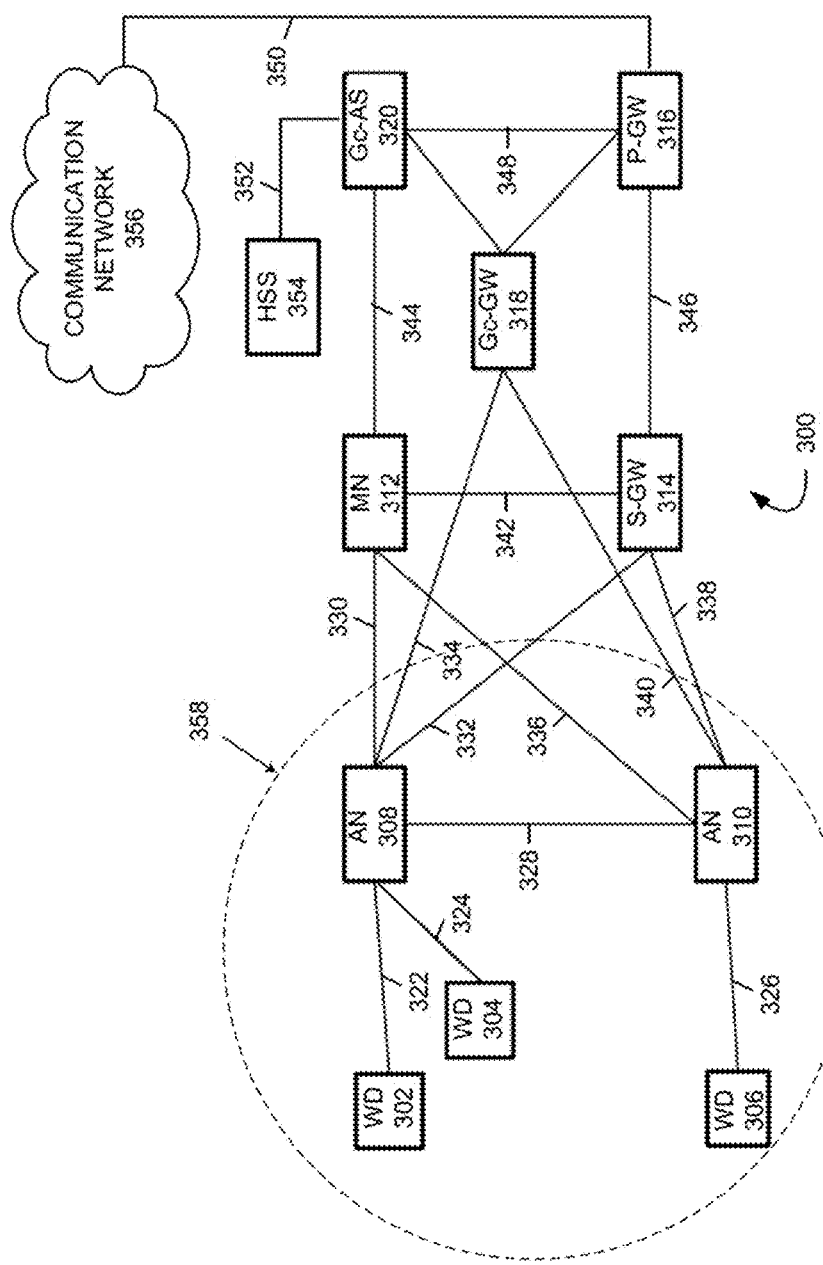
FIG. 3 illustrates another exemplary communication system to provide a group call service area.

FIG. 3 illustrates another exemplary communication system 300 to provide a service area for a group call. Communication system 300 may comprise wireless devices 302, 304, and 306, access nodes 308 and 310, management node 312, gateway nodes 314 and 316, group call gateway node 318, group call server node 320, home subscriber server 354, communication network 356, service area 358, and communication links 322, 324, 326, 328, 330, 332, 334, 336, 338, 340, 342, 344, 346, 348, 350, and 352. Other network elements may be present in the communication system 300 to facilitate communication but are omitted for clarity, such as base stations, base station controllers, gateways, mobile switching centers, dispatch application processors, and location registers such as a home location register or visitor location register.

Wireless devices 302, 304, and 306 can be any device configured to communicate over communication system 300 using a wireless communication link. For example, wireless devices 302, 304, and 306 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with the depicted access nodes, any number of wireless devices can be implemented.

Access nodes 308 and 310 are network nodes capable of providing wireless communications to wireless device 302, and can be, for example, a base transceiver station, a radio base station, a small cell (e.g., picocell, femtocell, and the like) and an eNodeB device. Although only two access nodes are illustrated in FIG. 1, wireless devices 302, 304, and 306 (and other wireless device not depicted) can be in communication with a plurality of access nodes and/or small cells. The plurality of access nodes and/or small cells can be associated with different networks and can support different communication protocols and radio access technologies.

Management node 312 can comprise a processor and associated circuitry to execute or direct the execution of computer-readable instructions to obtain information. Management node 312 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Management node 312 can receive instructions and other input at a user interface. In an embodiment, management node 312 comprises a controller node, a mobility management entity (MME) node, or any other suitable management node.

Gateway nodes 314 and 316 are network elements which can comprise a processor and associated circuitry to execute or direct the execution of computer-readable instructions. Gateway node 314 and 316 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway nodes 314 and 316 can provide instructions to access nodes 308 and 310 related to channel selection in communications with wireless devices 302, 304, and 306. In some embodiments, gateway nodes 314 and 316 may comprise a single node. Gateway nodes 314 and 316 can comprise at least one of a serving gateway (SGW), a packet data network gateway (PDNGW), a cellular gateway (CGW), and a combination thereof.

Group call server node 320 can comprise a processor and associated circuitry to execute or direct the execution of computer-readable instructions to obtain information. Group call server node 320 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Group call server node 320 can receive instructions and other input at a user interface. In some embodiments, management node 312 and group call server node 320 may comprise a single node.

Group call gateway node 318 is a network element which can comprise a processor and associated circuitry to execute or direct the execution of computer-readable instructions. Group call gateway node 318 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In some embodiments, gateway nodes 314 and 316 and group call gateway node 318 may comprise a single node.

Home subscriber server (HSS) node 354 can comprise a processor and associated circuitry to execute or direct the execution of computer-readable instructions to obtain information. Home subscriber server node 354 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Home subscriber server node 354 can receive instructions and other input at a user interface. In an embodiment, home subscriber server node 354 includes a database and stores subscription information for wireless devices. For example, home subscriber server node 354 may perform the functions of a home location register (HLR) and an authentication center (AuC). The functions of home subscriber server node 354 may include user identification and addressing, user profile management, manual network terminal authentication, and other similar services.

Communication network 356 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 356 can be capable of carrying voice information and other information, for example, to support communications by a wireless device such as wireless device 302. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 356 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 356 may also comprise a wireless network, including base stations, wireless communication nodes, telephony switches, internet routers, network gateways, computer systems, communication links, or some other type of communication equipment, and combinations thereof.

Communication links 322, 324, 326, 328, 330, 332, 334, 336, 338, 340, 342, 344, 346, 348, 350, and 352 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

In operation, access node 308 may establish communication with wireless devices 302 and 304 such that access node 306 provides the wireless devices access to a communication network (e.g., communication network 352) and access node 310 may establish communication with wireless device 306 such that access node 310 provides the wireless device access to a communication network (e.g., communication network 352). In an embodiment, system 300 may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, a group call may be established for a plurality of participant wireless devices. For example, a group call may be beneficial to organizations that seek a plurality of wireless devices participants, the ability to provide input for a number of the wireless device participants, and the ability to actively listen for a number of the wireless device participants. Some implementation of group calling may be inefficient. For example, downlink data on a group call is often the same for the listening participants. Accordingly, a degree multicasting may be leveraged to enhance efficiency. Further, a plurality of access nodes may each include a plurality of wireless device participants. For example, access node 106 may be in communication with a plurality of wireless devices that comprise group call participants and access node 108 may be in communication with a plurality of wireless devices that comprise group call participants. Here, multicasting to each access node that includes a participant may further provide efficiency with regard to link resources.

In an embodiment, group calls may be associated with particular service areas. For example, a group call established with reference to system 300 may comprise service area 358. The service area may comprise a signal area for the access nodes participating in the group call (e.g., access nodes 308 and 310) a geographic area, a predetermined location, such as a building, stadium, college campus, and the like. Here, providing group calls within a service area and notifying relevant wireless devices may benefit users of the system.

In an embodiment, system 300 may perform a group call using LTE radio access technology and network elements. In such an embodiment, the wireless device, such as wireless device 302, may include group call applications or implement group call protocols. In some examples, the wireless device may include both a groupcast or multicast data bearer and a unicast data bearer such that group call data is communicated over the multicast bearer and control data (or other data) is communication over the unicast bearer. The wireless device may comprise multiple cell RNTI support.

In an embodiment, the access node, such as access node 308, may perform radio network layer management and radio network and transport network resource management for the group call communication with wireless devices. The eNB may also perform radio network layer system information generation and management, and scheduling and transmission for group call communication with wireless devices.

In an embodiment, the management node, such as management node 312, may perform core network management, such as E-RAB setup, deletion, modification, and management. The management node may also perform NAS layer processing and relaying for group call communication and core related system information management and application layer system information relay for group call communication.

In an embodiment, gateway nodes, such as gateway nodes 314 and 316, may perform group communication control support, such as group call floor support. The gateway nodes may also manage EPS unicast and group call multicast data bearers.

In an embodiment, a group call server node, such as group call server node 320, may perform group call application layer management, such as group call setup, release, participant addition and removal, and floor control. The group call server node may also perform group call media management, management of security keys for group calls, and group call application layer system information management.

In an embodiment, the group call gateway node, such as group call gateway node 318, may perform group call multicast bearer path management including transport network resource management. The group call gateway node may also perform unicast and group cast data bearer handling and group call communication security enforcement.

Figure 4:
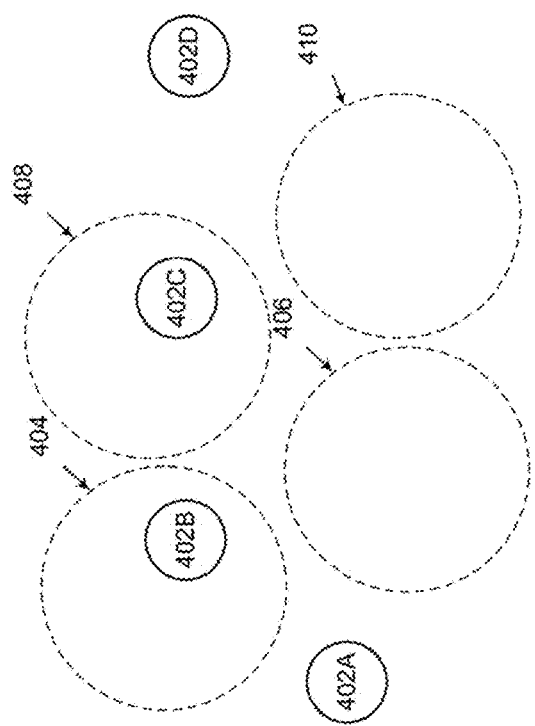
FIG. 4 illustrates another exemplary communication system to provide a group call service area.

FIG. 4 illustrates another exemplary communication system 400 to provide a service area for a group call. Communication system 400 may comprise wireless device 402A and service areas 404, 406, 408, and 410. In an embodiment, established group calls may be associated with particular service areas. For example, one or more group calls established with reference to system 400 may comprise a service area 404, 406, 408, and 410. The service areas may comprise a signal area for the access nodes participating in the group call (not illustrated) a geographic area, a predetermined location, such as a building, stadium, college campus, and the like. A particular established group call may be associated with one of service areas 404, 406, 408, and 410 or multiple service areas.

In an embodiment, wireless device 402A, 402B, 402C, and 402D, may comprise a single wireless device located in different locations at different points in time, for example based on a mobility for the wireless device. In an embodiment, at a first point in time wireless device 402A may be outside the illustrated service areas. At a second point in time, wireless device 402B may have entered service area 404. As such, the wireless device may participate in a group call associated with service area 404. At a third point in time, wireless device 402C may have entered service area 408. As such, the wireless device may participate in a group call associated with service area 408. In an embodiment, wireless device 402C may opt to continue participating on the group call associated with service area 404 if, when located in service area 404, the wireless device joined the call. In another embodiment, wireless device 402C may be removed from a group call associated with service area 404 when the wireless device exits the service area.

At a fourth point in time, wireless device 402D may have exited service area 408. In an embodiment, wireless device 402D may opt to continue participating on the group call associated with service area 404 if, when located in service area 404, the wireless device joined the call or may opt to continue participating on the group call associated with service area 408 if, when located in service area 408, the wireless device joined the call. In another embodiment, wireless device 402D may be removed from a group call associated with service area 408 when the wireless device exits the service area. FIGS. 5-8 illustrate group call flows for various group call related functions.

Figure 5A:
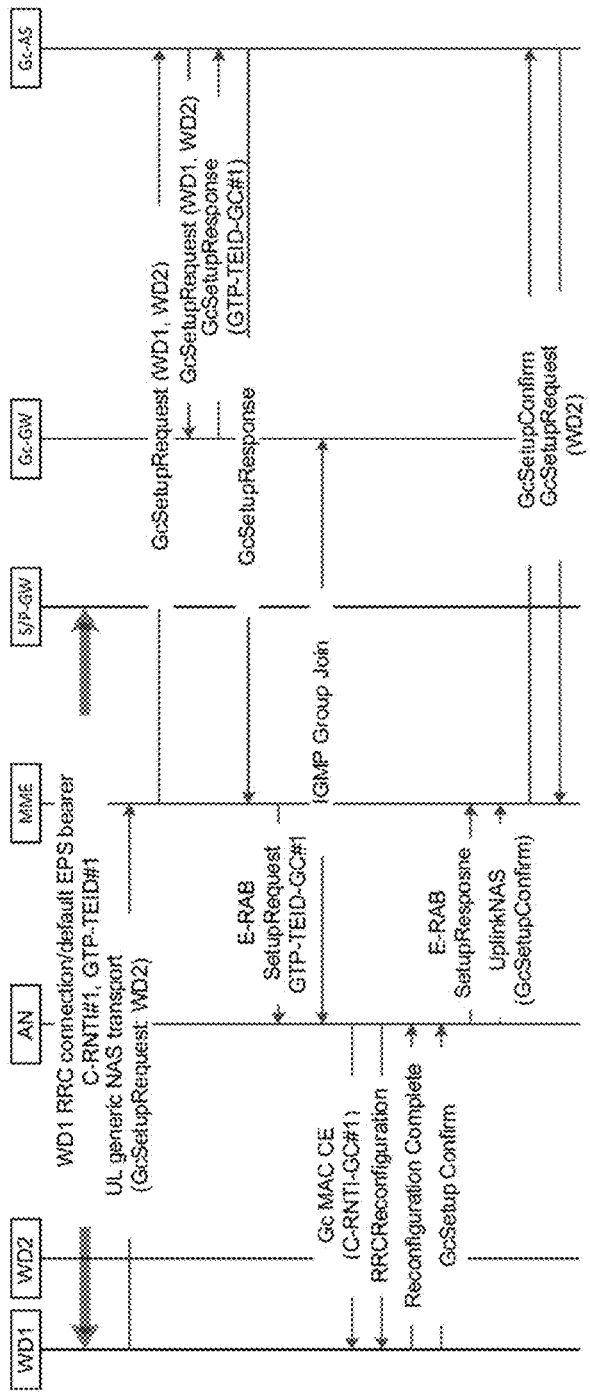
FIGS. 5A and 5B illustrate an exemplary signaling flow for establishing a group call.
Figure 5B:
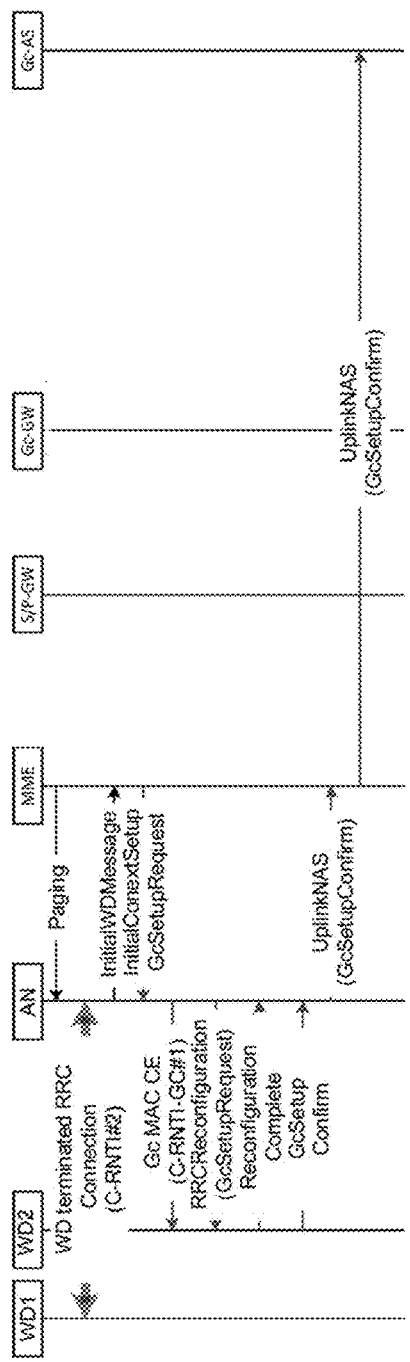

FIGS. 5A-5B illustrate an exemplary group call flow for establishing a group call according to an embodiment. In the illustrated embodiment in FIG. 5A, wireless device 1 and wireless device 2 may be in communication with an access node. The illustrated management node, gateway node, group call gateway node, and group call application server node may comprise a core network.

Wireless device 1 may transmit a NAS message that indicates wireless device 1 requests to establish a group call with wireless device 2. The request may be relayed from the management node to the group call server node, and the group call server node and the group call gateway may communicate and establish a group call identification for the requested group call. Subsequently, a group call setup response may be transmitted to the management node from the group call server node. The management node may then establish the multicast bearer with the access node for the group call. The access node may then send an Internet Group Management Protocol (IGMP) group join message to the group call gateway node.

As illustrated in FIG. 5B, the access node and wireless device may then transmit MAC and RRC connection messages such that the data bearers for the group call are setup for wireless devices 1 and 2. The pervious unicast bearer for wireless devices 1 and 2 with the access node may be terminated, and the new group call bearers (e.g., unicast bearer and multicast bearer) may be set up contemporaneously. Once complete, and NAS message may be transmitted from the access node to the management node, and passed on to the group call server node to such that the established group call is confirmed.

Figure 6:
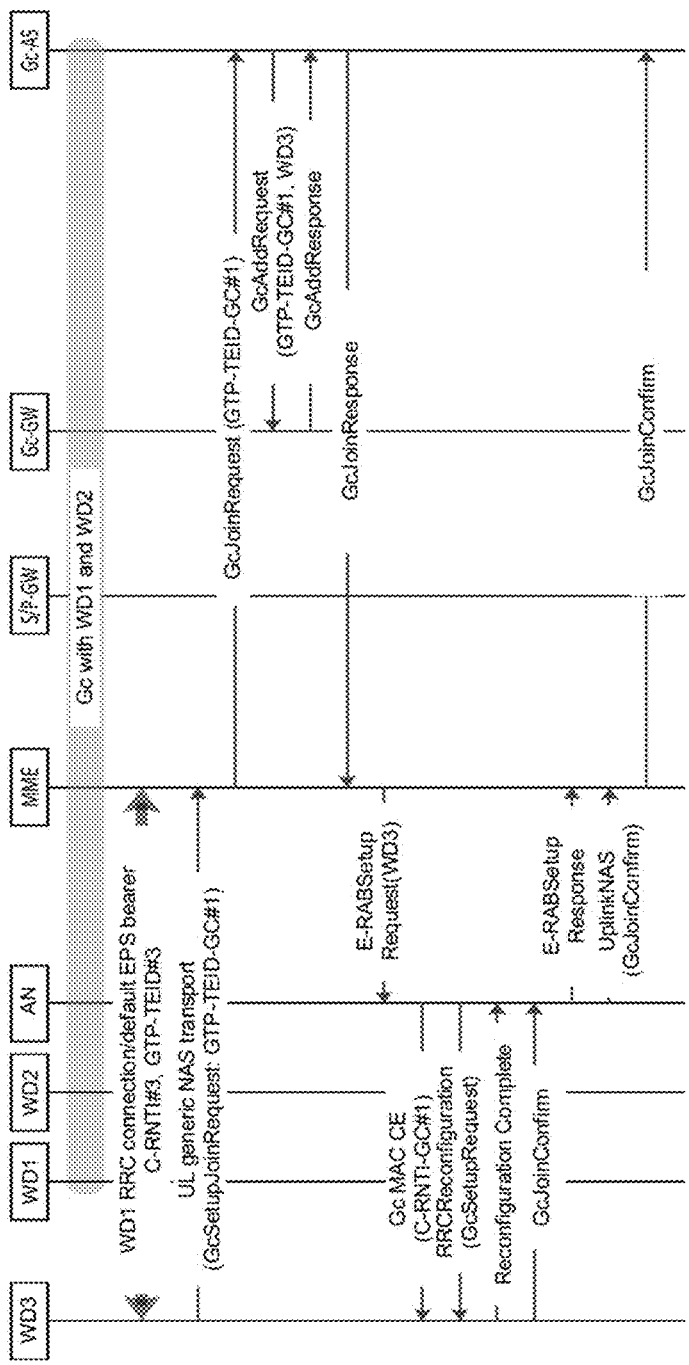
FIG. 6 illustrates an exemplary signaling flow for joining a group call.

FIG. 6 illustrates an exemplary group call flow for joining a group call according to an embodiment. In the illustrated embodiment, wireless device 3 requests to join a group call established between wireless devices 1 and 2, such as the group call established with reference to FIGS. 5A and 5B.

In an embodiment, wireless device 3 transmits an NAS message that indicates the wireless device requests to join the group call, the indication including the group call ID for the established group call. The management node transmits a join request to the group call server node, that then communicates with the group call gateway to process the group join request. The group call server node then transmits a response to the management node.

Once the response is received the management node and access node establish the data bearers (e.g., unicast data bearer and multicast data bearer) for the group call with wireless device 3. Once established, a group call join confirm message is sent to the group call server node.

Figure 7:
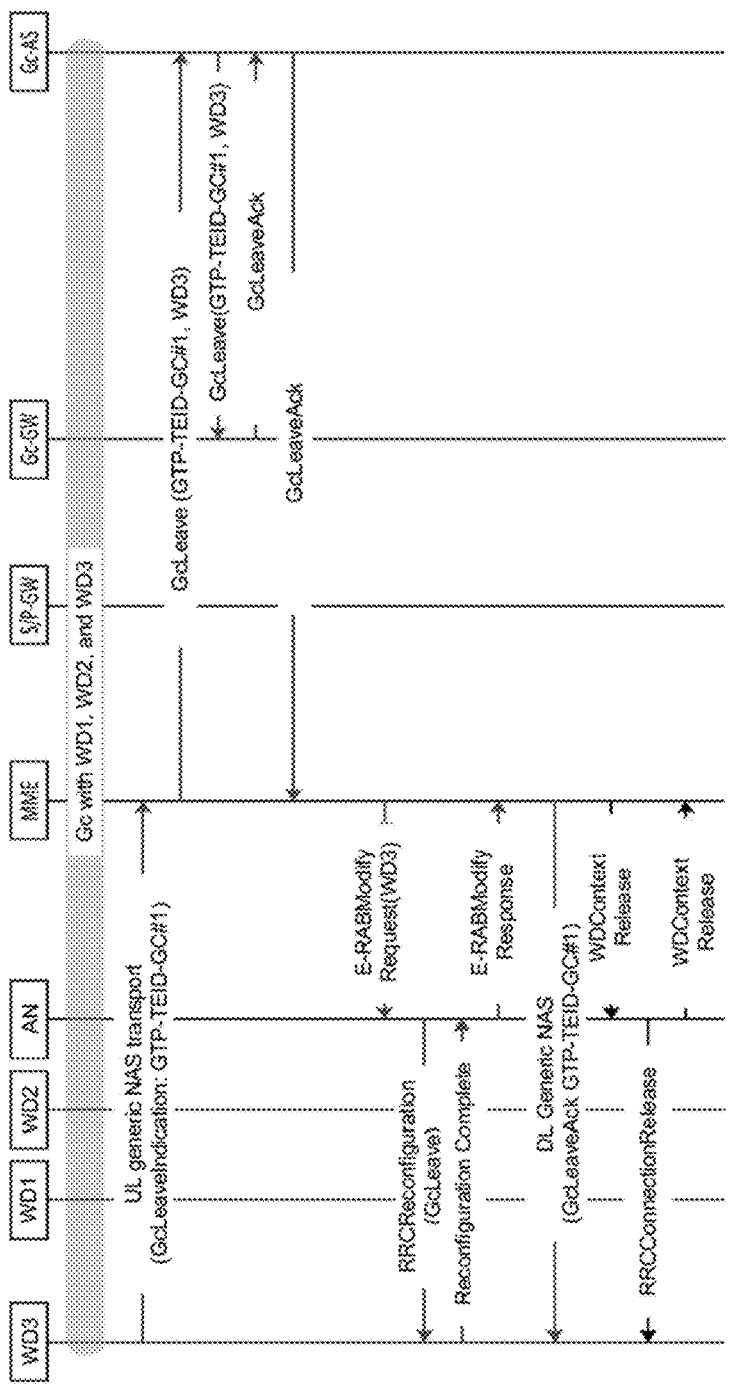
FIG. 7 illustrates an exemplary signaling flow for leaving a group call.

FIG. 7 illustrates an exemplary group call flow for leaving a group call according to an embodiment. In the illustrated embodiment, wireless device 3 requests to leave a group call established between wireless devices 1 and 2, such as the group call established with reference to FIGS. 5A and 5B.

In an embodiment, wireless device 3 transmits an NAS message that indicates the wireless device requests to leave the group call, the indication including the group call ID. The management node transmits a leave request to the group call server node that then communicates with the group call gateway to process the group leave request. The group call server node then transmits a response to the management node.

Once the response is received the management node and access node process messages to release the data bearers (e.g., unicast data bearer and multicast data bearer) for the group call established for wireless device 3. Once processed, a group call leave confirm message is sent to the group call server node.

Figure 8:
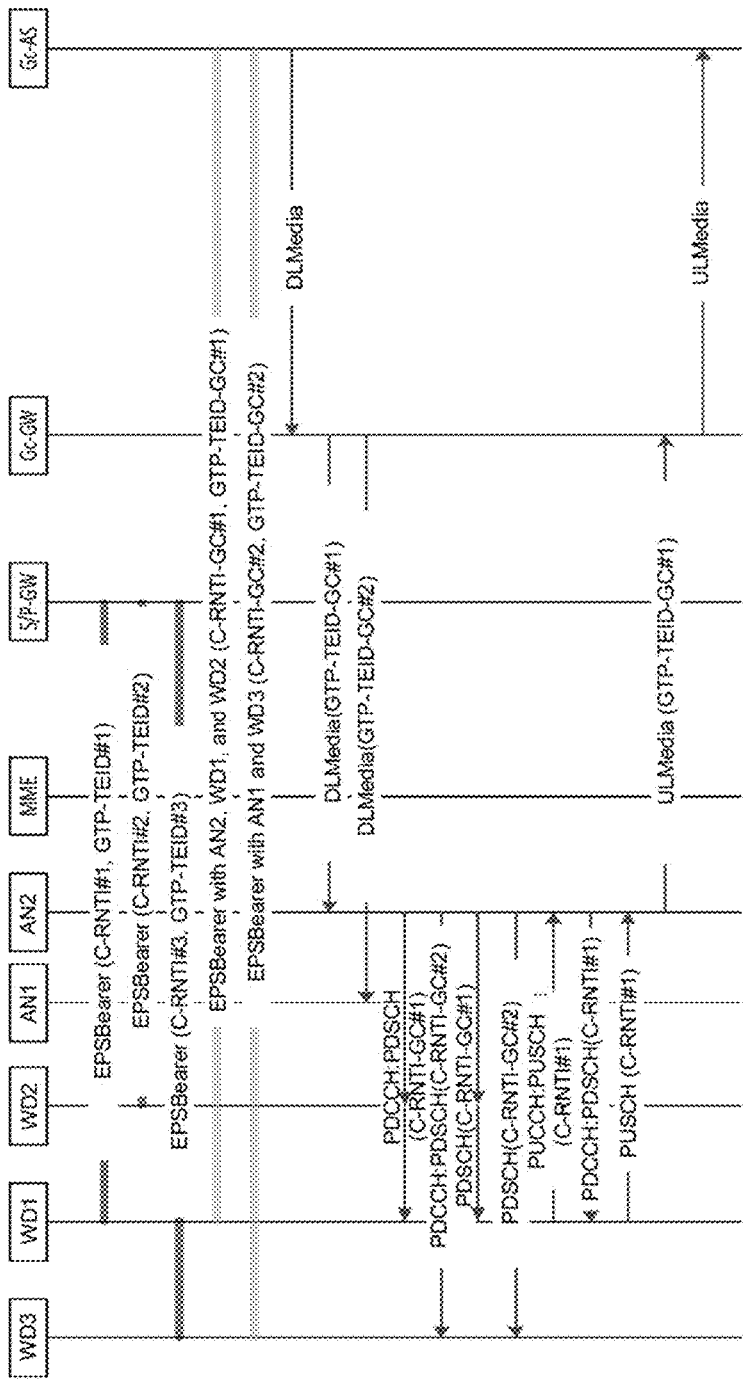
FIG. 8 illustrates an exemplary signaling flow for media flow in a group call.

FIG. 8 illustrates an exemplary group call flow for media flow for a group call according to an embodiment. In the illustrated embodiment, media is shared for a group call established between wireless devices 1, 2, and 3, where wireless devices 1 and 2 are in communication with access node 2 and wireless device 3 is in communication with access node 1. In an embodiment, EPS bearers have been established between wireless device 1, access node 2, and the core network, between wireless device 2, access node 2, and the core network, and between wireless device 3, access node 1, and the core network. In an embodiment, wireless devices 1, 2, and 3 comprise a unicast radio bearer and a multicast radio bearer, while access node 1 and access node 2 each comprise a multicast data bearer associated with the group call.

Downlink media data, such as group call voice data, may be transmitted from the group call server node, to the group call gateway node, and through the core over the relevant multicast bearer to access nodes 1 and 2. Access nodes 1 and 2 may then schedule radio transmission to wireless devices 1, 2 and 3 using a scheduler, such as a dynamic scheduler. Based on the scheduled transmissions, access nodes 1 and 2 may transmit the downlink media data to wireless devices 1, 2, and 3 using downlink transmissions (e.g., downlink physical resource blocks). The media may be transmitted to wireless devices 1, 2, and 3 using the multicast radio data bearer established between the wireless devices and the access nodes.

In an embodiment, wireless device 1 may comprise permission to transmit uplink media data (e.g., voice data) for the group call, or wireless device 1 may have the floor. Here, access node 2 may schedule an uplink transmission for wireless device 1, and according to the schedule, wireless device 1 may transmit the uplink data to access node 2. The media may be transmitted from wireless device 1 to access node 2 over a physical uplink shared channel (PUSCH). The uplink data may then be transmitted from access node 2 to the group call server node over the established bearer for the group call.

Figure 9:
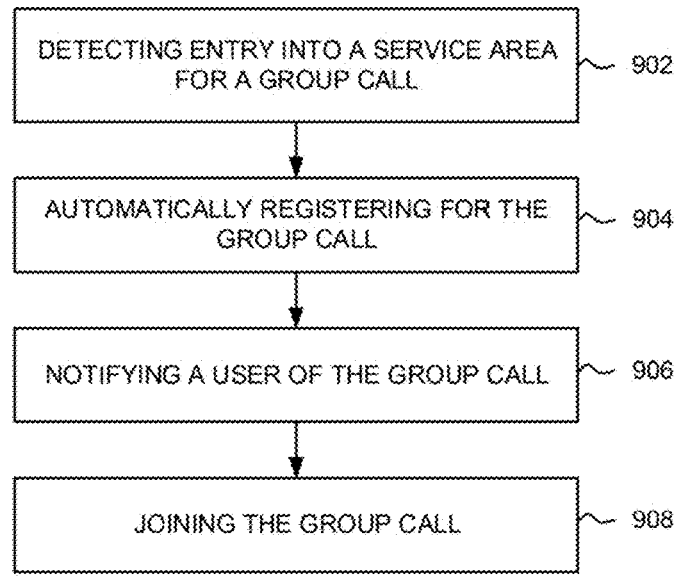
FIG. 9 illustrates another exemplary method for to providing a group call service area.

FIG. 9 illustrates an exemplary method providing a service area for a group call according to an embodiment. The method will be discussed with reference to the exemplary communication system 300 illustrated in FIG. 3, however, the method can be implemented with any suitable communication system.

Referring to FIG. 9, at step 902, it is detected at a wireless device that participation in a group call with a first group call identification is available, wherein the detecting is based on entry into a service area for the group call. For example, wireless device 302 may enter into service area 358, wherein the entry allows wireless device 302 to participate in an established group call associated with service area 358.

In an embodiment, service area 358 may comprise one or more access nodes that broadcast system information block (SIB) messages that include various attributes and parameters about communicating with the access nodes. For example, one or more of the access nodes in service area 358 may broadcast an SIB message that at least in part is defined by the below specifications:

with home subscriber services node 354 such that one or more participant wireless devices may be added as subscribers to a group call identified by a particular GCGI. Group call server node 320 may then distribute a created GCGI and GCSA for a group call to one or more of group call gateway node 318, gateway nodes 314 and 316, management node 312, and access nodes 308 and 310. Access nodes 308 and 310 may then broadcast the GCGI and GCSA in accordance with the SIB message described herein.

In an embodiment, a GCGI may comprise a PLMN ID (Mobile country code+mobile network code)+a group communication service identity (3 octets). In an embodiment, a GCSA may comprise a list of GCSAIs that are comprised by the GCSA. In an embodiment, a GCSAI may comprise a list of cells, access nodes, small cells, access points, and/or management nodes, where the list of GCSAIs make up the membership (e.g., network node membership) of a GCSA.

At step 904, the wireless device is automatically registered for the established group call. For example, wireless device 302 automatically transmits a group call registration request to access node 308, and the access node transmits the group call registration request to the core network (e.g., management node 312, gateway nodes 314 and 316, group call gateway 318, group call server node 320, and the like).

In an embodiment, wireless device 302 may transmit a registration request to access node 308 which is then relayed to group call server node 320. The registration request may include identifying information for the group call from the SIB message received from access node 308 (e.g., GCGI).

```
SystemInformationBlockTypeX information element
-- ASN1START
SystemInformationBlockTypeX ::=        SEQUENCE {
    groupCommunicationAnnounce         GroupCommunicationGroup-List        OPTIONAL,
    lateNonCriticalExtension           OCTET STRING                        OPTIONAL,
}
GroupCommunicationGroup-List ::=       SEQUENCE { SIZE(1..maxGCGI) GroupCommunicationGroup
GroupCommunicationGroup ::=     SEQUENCE {
    groupCommunicationGroupIdentity          GroupCommunicationGroupIdentity,
    groupCommunicationServiceArea            GroupCommunicationServiceArea
}
GroupCommunicationGroupIdentity ::=        SEQUENCE {
    plmn-Identity                              PLMN-Identity
    groupCommunicationServiceIdentity          GroupCommunicationServiceIdentity
}
GroupCommunicationServiceIdentity ::=      INTEGER (0..16777215)
groupCommunicationServiceArea ::=      SEQUENCE (SIZE (1..maxGCSAI) OF GroupCommunicationServiceAreaIdentity,
GroupCommunicationServiceAreaIdentity ::=          INTEGER (0..65535)
-- ASN1STOP
maxGCGI     INTEGER ::= 256 - maximum number of group communication group communication
            identities that a LTE cell can announce
maxGCSAI    INTEGER ::= 256 - maximum number of group communication service area identities
                    where the UE can get group communication service and service continuity
```

In an embodiment, based on wireless device 302 receiving the broadcast SIB message with the group call information, the wireless device may detect that participation in a group call with a first group call identification is available. For example, wireless device 302 may be configured to receive the broadcast SIB message that comprises a predetermined structure and locate the parameters for an available group call, such as the group communication group identity (e.g., GCGI) and group communication service area (e.g., GCSA).

In an embodiment, when a group call is established group call server node 320 may perform GCGI and GCSA creation, distribution and management, where a GCSA may include a list of group communication service area identities (GCSAIs). Group call server node 320 may communication The group call server node may then register wireless device 302 for the group call based on the identifying information provided in the request. In an embodiment, group call server node 320 or home subscriber server node 354 may perform security procedures before registering wireless device 302. For example, the security procedures may include verifying that wireless device 302 is within a service area for the identified group call, determining whether wireless device 302 has permission to register for the group call (e.g., based on a list of authorized wireless devices), and the like. Group call server node 320 may then register wireless device 302 for the group call upon completion of the security procedures.

At step 906, the user of the wireless device is notified that participation in the group call is available. For example, after wireless device 302 is registered to join the group call, the user of the wireless device may be notified (e.g., using a display on a screen of the wireless device) that participation on the group call is available.

In an embodiment, the service area 358 may comprise a building, for example on a college campus. The user of wireless device 302 may comprise a student that attends a class within the building, where the class comprises an established group call. Upon entry of the building, wireless device 302 may automatically register the wireless device for the group call, as discussed herein, and subsequently notify the user (e.g., student) of the availability of the group call for the class. In an embodiment, the security procedures for the group call may include checking wireless device 302 against a registration list that associates wireless devices with students enrolled in the class. Where it is confirmed that wireless device 302 is associated with an enrolled student, the wireless device may be registered for the group call.

In an embodiment, the service area 358 may comprise a number of other areas, such as a sports stadium, a corporate office or headquarters, a predetermined geographic region, an airport, and the like. In these examples, the user of wireless device 302 may comprise an attendee of a sporting event, an employee, an airline passenger, or any other suitable user. In an embodiment, the user notification of the availability of the group call may comprise an indication on the display of wireless device 302, such as an incoming push notification from software running on wireless device 302, and/or an urgent notification that comprises a ring or vibration to alert the user of the availability of the group call.

At step 908, the wireless device may join the group call after receiving an indication from the user, wherein joining the group call includes receiving downlink group call voice data from an access node in communication with the wireless device. For example, the user of wireless device 302 may provide an indication that instructs the wireless device to join the group call (e.g., clicking/pressing a join button displayed on the display of the wireless device). In an embodiment, joining the group call comprises receiving downlink group call voice data from access node 308 using one or more bearers established for carrying group call data.

In an embodiment, the group call data is transmitted from access node 308 to wireless device 302 over a physical shared downlink channel (PSDCH). For example, downlink resource (e.g., physical resource blocks) may be scheduled for transmissions that carry the group call data, and access node 308 may transmit the group call data to wireless device 302 according to the scheduling.

FIG. 6 illustrates an embodiment where a wireless device joins an established group call. For example, wireless device 302 may follow the call flow illustrated in FIG. 6 to join the group call after indication is received from a user of the wireless device.

In an embodiment, for the group call each participant wireless device of the group call comprises downlink permissions and a subset of participant wireless devices of the group call comprise uplink permissions. For example, a single wireless device participant may comprise uplink permissions while the remaining wireless device participants comprise downlink permissions. In this example, the connection to the group call for the participant wireless devices effectively comprises a half-duplex connection (e.g., uplink or downlink).

Figure 10A:
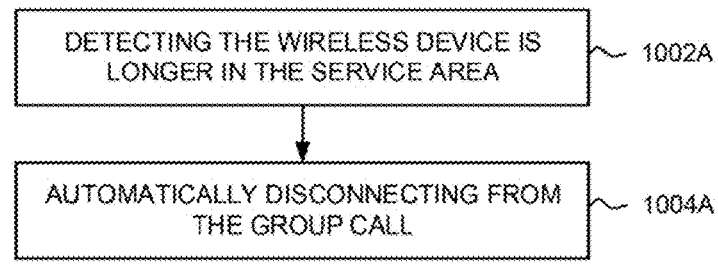
FIGS. 10A and 10B illustrate exemplary methods for managing group call participation when leaving a service area.
Figure 10B:
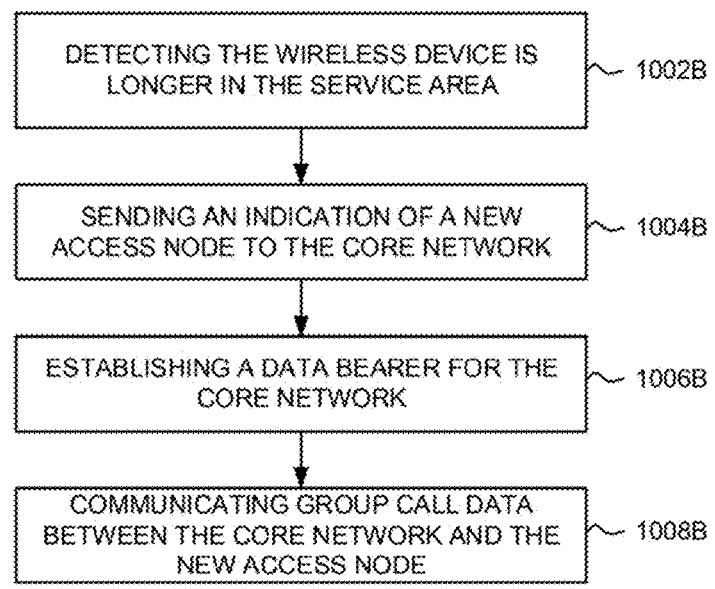

In an embodiment, wireless device 302 may exit service area 358. For example, as illustrated in FIG. 4 by wireless devices 402A, 402B, 402C, and 402D, at various points in time a wireless device may enter and exit various service areas. FIGS. 10A and 10B illustrate embodiments where wireless device 302 has exited service area 358.

FIG. 10A illustrates an exemplary method for managing group call participation when leaving a service area according to an embodiment. The method will be discussed with reference to the exemplary communication system 300 illustrated in FIG. 3, however, the method can be implemented with any suitable communication system.

Referring to FIG. 10A, at step 1002A, it is detected that the wireless device is no longer in the service area. For example, it may be detected that wireless device 302 has exited service area 358. In an embodiment, it may be determined that wireless device 302 has exited service area 358 based on a handover to an access node that is not part of the service area (e.g., a handover to an access node not part of the GCSAIs that comprise GCSA for service area 358). In another embodiment, a location can be detected for wireless device 302, and the location may be compared to a geographic region for service area 358. The location for wireless device 302 may be determined based on one or more of signal triangulation, global position system coordinates, mobility detection, and the like. In another embodiment, a signal level for communication with access node 308 may fall below a threshold that indicates the wireless device has exited the service area.

At step 1004A, the wireless device may automatically disconnect from the group call based on exiting the service area. For example, wireless device 302 may automatically disconnect from the group call associated with service area 358 based on exiting the service area. FIG. 7 illustrates an embodiment where a wireless device leaves a group call. For example, wireless device 302 may follow the call flow illustrated in FIG. 7 to automatically leave the group call after it is detected that the wireless device has exited service area 358.

FIG. 10B illustrates another exemplary method for managing group call participation when leaving a service area according to an embodiment. The method will be discussed with reference to the exemplary communication system 300 illustrated in FIG. 3, however, the method can be implemented with any suitable communication system.

Referring to FIG. 10B, at step 1002B, it is detected that the wireless device is no longer in the service area. For example, it may be detected that wireless device 302 has exited service area 358. In an embodiment, it may be determined that wireless device 302 has exited service area 358 based on a handover to an access node that is not part of the service area.

At step 1004B, an indication of the new access node to be joined to the group call may be transmitted to the core network. For example, wireless device 302 comprise a target access node such that the wireless device is to be handed over from access node 308 to the target access node. In an embodiment, prior to the handover, wireless device 302 may transmit a join request to access node 308 (which may be relayed to group server node 320) that comprises an identifier for the target access node (e.g., PLMN ID) and an identifier for the group call (e.g., GCGI) such that the access node may be added to the group call.

At step 1006B, a multicast data bearer associated with the group call may be established for the target access node. For example, based on the received request at group server node 320 a multicast data bearer associated with the group call (e.g., based on the GCGI) may be established for the target access node. The establishing may be similar to the establishment of a multicast data bearer illustrated in FIGS. 5A and 5B. In an embodiment, wireless device 302 may perform a handover to the target access node for which the multicast data bearer has been established.

At step 1008B, group call data may be communicated between the target access node and the wireless device, wherein downlink group call data from the core network for the wireless device is transmitted to the target access node over the multicast data bearer. For example, group call data for wireless device 302 may be carried from the core network to the target access node over the multicast data bearer. The target access node may then schedule radio resources (e.g., physical resource blocks) for the communication and transmit the group call data to wireless device 302 using the scheduled resources.

In an embodiment, when a group call is established, such as the group call established as illustrated in FIGS. 5A and 5B, one or more participant wireless devices may be paged. For example, FIG. 5B illustrates a paging message used to connect a wireless device to the group call.

Figure 11:
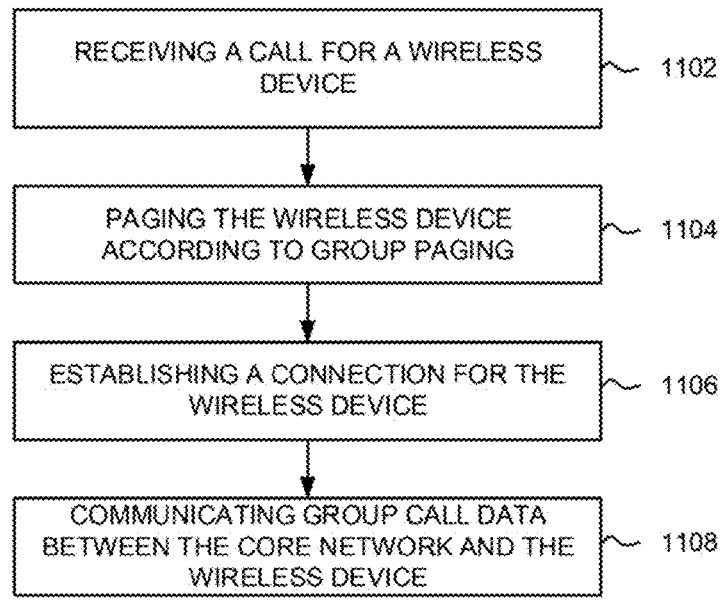
FIG. 11 illustrates an exemplary method for group call paging.

FIG. 11 illustrates an exemplary method for paging a wireless device for a group call according to an embodiment. The method will be discussed with reference to the exemplary communication system 300 illustrated in FIG. 3, however, the method can be implemented with any suitable communication system.

Referring to FIG. 11, at step 1102, a group call request may be received from a wireless device. For example, wireless device 302 may transmit a group call request to access node 308 to establish a group call with wireless devices 304 and 306. As illustrated in FIGS. 5A and 5B, a At step 1104, the participant wireless devices may be paged to join the group call. For example, wireless devices 304 and 306 may be paged to join the group call, as illustrated in FIG. 5B. In this example, wireless devices 304 and 306 may not comprise an active connection (e.g., RRC connection) with an access node (e.g., may be in idle mode). In an embodiment, a group paging message may be implemented rather than individual paging messages for wireless devices 304 and 306. For example, a group call may comprise a subscriber group, or a group of participant wireless devices. In this example, the subscriber group comprises wireless devices 302, 304, and 306. In an embodiment, the participant wireless devices that comprise a subscriber group for a group call may store identification information for the group call (e.g., GCID) at the individual wireless devices.

In an embodiment, one or more nodes of the core network (e.g., access nodes 308 and 310, management node 312, gateway nodes 314 and 316, group call gateway node 318, and group call server node 320) may store information for group calls, such as a GCGI in association with a GCSA and list of GCSAIs. A paging message comprising a particular GCGI may thus be routed to appropriate management nodes and access nodes for paging wireless devices based on the service area associated with the GCGI (e.g., list of management nodes and access nodes known based on the GCSAIs). Below is an example group call RRC paging message that may be broadcast to wireless devices during a page interval in accordance with an embodiment:

```
-- ASN1START
Paging ::=                        SEQUENCE {
    pagingRecordList                  PagingRecordList           OPTIONAL,    -- Need ON
    systemInfoModification            ENUMERATED {true}          OPTIONAL,    -- Need ON
    etws-Indication                   ENUMERATED {true}          OPTIONAL,    -- Need ON
    nonCriticalExtension              Paging-v890-IEs            OPTIONAL
}
Paging-v890-IEs ::=               SEQUENCE {
    lateNonCriticalExtension          OCTET STRING               OPTIONAL,
    nonCriticalExtension              Paging-v920-IEs            OPTIONAL
}
Paging-v920-IEs ::=               SEQUENCE {
    cmas-Indication-r9                ENUMERATED {true}          OPTIONAL,    --Need ON
    nonCriticalExtension              Paging-v1130-IEs           OPTIONAL
}
Paging-v1130-IEs ::=              SEQUENCE {
    eab-ParamModification-r11         ENUMERATED {true}          OPTIONAL,    --Need ON
    nonCriticalExtenstion             SEQUENCE { }               OPTIONAL
}
PagingRecordList ::=              SEQUENCE (SIZE (1 . . . maxPageRec)) OF PagingRecord
PagingRecord ::=                  SEQUENCE {
    ue-Identity                           PagingUE-Identity,
    cn-Domain                             ENUMERATED {ps, cs},
    groupCommunicationGroup-Identity      GroupCommunicationGroupIdentity
    . . .
}
PagingUE-Identity ::=             CHOICE {
    s-TMSI                                S-TMSI,
    imsi                                  IMSI,
    . . .
}
IMSI ::=                          SEQUENCE (SIZE (6 ..21)) OF IMSI-Digit
IMSI-Digit ::=                    INTEGER (0..9)
GroupCommunicationGroupIdentity ::=   SEQUENCE {
    plmn-Identity                         PLMN-Identity,
    groupCommunicationServiceIdentity     GroupCommunicationServiceIdentity
}
GroupCommunicationServiceIdentity ::=   INTEGER (0..16777215)
-- ASN1STOP
``` numbers of bearers, such as a multicast bearer, may be established based on the request.

The group call RRC paging message comprises the GCGI for the group call in addition to a group communication service identity (GCS-I). Based on the GCGI and the GCS-I, the paging message may be transmitted by access nodes over a given service area for a group call, where multiple participant wireless devices can respond to a single paging message. Because the participant wireless devices store subscription information for call groups (GCGIs), the participant wireless devices can response to a paging message based on the listed GCGI, and do not rely on individual identification.

Below is an example of data contained in a group call S1-AP paging message in accordance with an embodiment:

| IE/Group Name | Note |
| --- | --- |
| Message Type | |
| UE Identity Index value | |
| UE Paging Identity | |
| GC Identity Index value | Group Communication Identity Index |
| GC Paging Identity | Group Communication Group Identity |
| Paging DRX | |
| CN Domain | |
| List of TAIs | |
| >TAI List Item | |
| >>TAI | |
| CSG Id List | |
| >CSG Id | |
| Paging Priority | |
| UE Radio Capability for Paging | |

In this example, access nodes are provided at least a group call identity index value and a group call paging identity to be used in broadcasting an RRC paging message. Below are further descriptions for the GC Identity Index value and the GC Paging Identity fields in accordance with an embodiment:

| IE/Group Name | Range | IE type and reference |
| --- | --- | --- |
| GC Identity Index Value | 0 ... 1023 | BIT STRING (SIZE (10)) |

| IE/Group Name | Range | IE type and reference |
| --- | --- | --- |
| GC Paging Identity | | |
| >PLMN-Identity | | OCTET STRING (SIZE (3)) |
| >GroupCommunication ServiceIdentity | 0 ... 1667215 | OCTET STIRNG (SIZE (3)) |

In addition, NAS attaches messages may also include group call information for when a wireless device attaches to an access node and establishes a mobile identity. Below is an example NAS attach response message in accordance with an embodiment:

| 8 | 7 | 6 | 5 | 4 | 3 | 2 | 1 | |
| --- | --- | --- | --- | --- | --- | --- | --- | --- |
| | | | Mobile Identity IEI | | | | | octet 1 |
| | | | Length of Mobile Identity Contents | | | | | octet 2 |
| spare | | | MCC/MNC indic | odd/even indic | Type of Identity (6) | | | octet 3 |
| MCC digit 2 | | | | MCC digit 1 | | | | octet 4 |
| MCC digit 3 | | | | MCC digit 3 | | | | octet 5 |
| MCC digit 2 | | | | MCC digit 1 | | | | octet 6 |
| Group Communication Service Identity | | | | | | | | octet 7 |
| | | | | | | | | octet 8 |
| | | | | | | | | octet 9 |

The GCS-I value contained in the NAS attach response message may be used by the access node to page the attaching wireless device when an incoming group call is received. For example, the GCSI-I can comprise a paging identity for the established group call, where group call participants may be paged using the identifier. Absent the GCSI-I identity, numerous paging message may be needed to page group call participants (e.g., attached to a single access node).

In an embodiment, because paged wireless devices are in idle mode (e.g., do not have an active connection with an access node) the wireless device periodically wakes up to monitor a downlink channel (e.g., physical downlink shared channel, PDSCH) to check for a paging message. The interval at which the wireless device wakes during idle mode is defined by the DRX cycle for the wireless device. For example, wireless devices 304 and 306 may wake up according to each wireless device's DRX cycle to listen for a paging message.

In an embodiment, with regard to broadcasting a paging message from an access node, such as access nodes 308 and 310, a paging occasion and paging frame are to be determined. The paging occasion comprises the subframe where a paging message is transmitted on the PDSCH and the paging frame is the radio frame that may comprise one or more paging occasions. In view of group paging being directed to multiple wireless devices, the paging frame and paging occasion will coordinate with not a single wireless device, but multiple wireless devices in some embodiments.

With regard to the system frame number (SFN), or paging frame, and paging occasion index (PO_index), the below relationship may be used in in accordance with an embodiment:

$$SFN \bmod T = (T/N) * (GC\_ID \% N)$$

$$PO\_Index = Floor(GC\_ID/N) \% Ns$$

T: DRX cycle of the UE=min (UE specific DRX cycle, cell specific DRX cycle)
nB: 4T, 2T, T, T/2, T/4, T/8, T/16, T/32.
N: min(T,nB), N=T, T/2, T/4, T/8, T/16 or T/32
Ns: max(1,nB/T), Ns=1, 2 or 4, number of PO (paging occasion within a PF (paging frame))
GC_ID: GroupPagingIdentity % 1024

In an embodiment, GroupPagingIdentity is composed of the PLMN Identity and the GCSI of 3 octets in length each. The PLMN Identity will be given as sequence of digits of type Integer (0 . . . 9) and GCSI will be given in binary format but interpreted as an eight digit decimal number with leading zeros if the decimal number is shorter than 8 digits in length in the formula above, where the resulting GC_ID is treated as a decimal number. For example, a GroupPagingIdentity with PLMN Identity of 310(MCC), 120(MNC) and GCSI of 0xABCDEF may be interpreted as a decimal number of 31012011259375. In another example, GroupPagingIdentity with PLMN Identity of 310(MCC), 120 (MNC) and GCSI of 0x001100 may be interpreted as a decimal number of 31012000004352.

In accordance with the group paging messaging and the group paging system frame number and paging occasion determined for a given paging message, wireless devices 304 and 306 may be paged for the group call requested by wireless device 302. For example, management node 312 (and other management nodes not depicted) may transmit messages to access nodes and other access points listed in the GCSAIs for the service area of the group call. The relevant access nodes and other access points (e.g., access nodes 308 and 310) may then broadcast the paging message (e.g., group call RRC paging message) according to the determined paging from and paging occasion such that participant wireless devices (e.g., wireless devices 304 and 306) may respond.

Reducing the number of paging messages required to page group call participant wireless devices can significantly reduce overhead on the system. In particular, group calls may comprise a plurality of wireless devices, and thus a paging message for each wireless device can introduce resource efficiency issues when establishing a group call. Accordingly, the group call paging message and related routing and call functions disclosed herein can provide significant overhead benefits to the system.

At step 1106, one or more data bearer associated with the group call may be established for the paged wireless device. For example, at least wireless device 304 may respond to a paging message from access node 308 and data bearer associated with the group call may be established such that wireless device 304 and access node 308 may communicate group call data (e.g., voice data). The establishing may be similar to the establishment of a data bearers illustrated in FIGS. 5A and 5B.

At step 1008, group call data may be communicated to the wireless device from the attached access node, wherein downlink group call data from the core network for the wireless device is transmitted to the access node over the multicast data bearer. For example, group call data for wireless device 304 may be carried from the core network to the access node 308 over the multicast data bearer. The access node 308 may then schedule radio resources (e.g., physical resource blocks) for the communication and transmit the group call data to wireless device 304 using the scheduled resources.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 12:
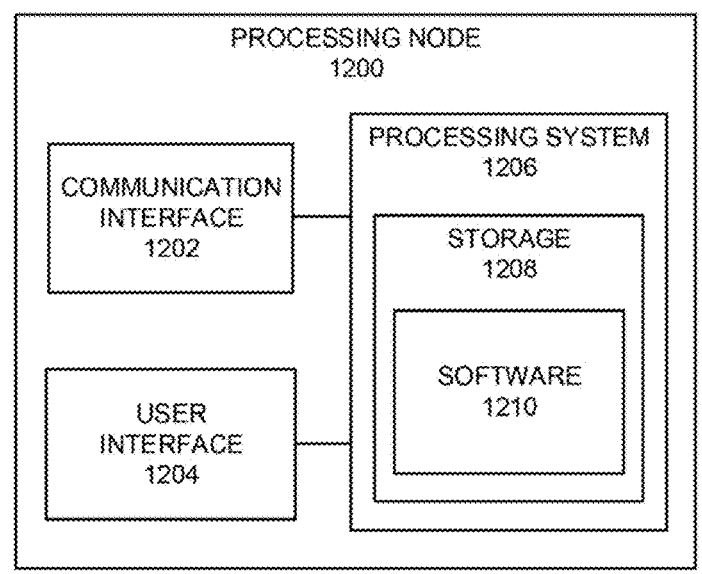
FIG. 12 illustrates an exemplary processing node.

FIG. 12 illustrates an exemplary processing node 1200 in a communication system. Processing node 1200 comprises communication interface 1202, user interface 1204, and processing system 1206 in communication with communication interface 1202 and user interface 1204. Processing node 1200 can be configured to determine a communication access node for a wireless device. Processing system 1206 includes storage 1208, which can comprise a disk drive, flash drive, memory circuitry, or other memory device. Storage 1208 can store software 1210 which is used in the operation of the processing node 1200. Storage 1208 may include a disk drive, flash drive, data storage circuitry, or some other memory apparatus. Software 1210 may include computer programs, firmware, or some other form of machine-readable instructions, including an operating system, utilities, drivers, network interfaces, applications, or some other type of software. Processing system 1206 may include a microprocessor and other circuitry to retrieve and execute software 1210 from storage 1208. Processing node 1200 may further include other components such as a power management unit, a control interface unit, etc., which are omitted for clarity. Communication interface 1202 permits processing node 1200 to communicate with other network elements. User interface 1204 permits the configuration and control of the operation of processing node 1200.

Examples of processing node 1200 include controller node 312 and gateway nodes 314 and 316. Processing node 1200 can also be an adjunct or component of a network element, such as an element of access nodes 106, 108, 308, or 310 and the like. Processing node 1200 can also be another network element in a communication system. Further, the functionality of processing node 1200 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for providing group call service areas, the method comprising:

detecting, at a wireless device, that participation in a group call with a first group call identification is available, wherein the detecting is based on entry into a service area for the group call;

automatically registering the wireless device to join the group call;

notifying a user of the wireless device that participation in the group call is available; and joining the group call after receiving an indication from the user, wherein joining the group call includes receiving downlink group call voice data from an access node in communication with the wireless device, wherein each participant wireless device of the group call comprises downlink permissions and a subset of participant wireless devices of the group call comprise media uplink permissions.

2. The method of claim 1, further comprising:
   detecting that the wireless device is no longer in the service area for the group call; and
   automatically disconnecting the wireless device from the group call.

3. The method of claim 2, further comprising:
   detecting, at the wireless device, that the wireless device is no longer in the service area for the group call based on a handover of the wireless device to a new access node;
   establishing a data bearer for the new access node associated with the group call; and
   communicating downlink group call data over the data bearer to the new access node such that the downlink group call data is transmitted from the access node to the wireless device.

4. The method of claim 1, wherein data for the group call is delivered to the access node from a core network over a multicast data bearer.

5. The method of claim 4, wherein the group call data comprises voice data and the core network comprises a packet switched network.

6. The method of claim 1, wherein the group call data is transmitted from the access node to the wireless device and a second wireless device in communication with the access node over a physical shared downlink channel.

7. A system for providing group call service areas, the system comprising:
   a wireless device with a processor configured to:
      detect that participation in a group call with a first group call identification is available, wherein the detecting is based on entry into a service area for the group call;
      automatically register the wireless device to join the group call;
      notify a user of the wireless device that participation in the group call is available; and
      join the group call after receiving an indication from the user, wherein joining the group call includes receiving downlink group call voice data from an access node in communication with the wireless device,
      wherein each participant wireless device of the group call comprises downlink permissions and a subset of participant wireless devices of the group call comprise media uplink permissions.

8. The system of claim 7, wherein the wireless device is further configured to:
   detecting that the wireless device is no longer in the service area for the group call; and
   automatically disconnecting the wireless device from the group call.

9. The system of claim 8, wherein the wireless device is further configured to:
   detect that the wireless device is no longer in the service area for the group call based on a handover of the wireless device to a new access node, wherein
      a data bearer is established for the new access node associated with the group call; and
      downlink group call data is communicated over the data bearer to the new access node such that the downlink group call data is transmitted from the access node to the wireless device.

10. The system of claim 7, wherein data for the group call is delivered to the access node from a core network over a multicast data bearer.

11. The system of claim 10, wherein the group call data comprises voice data and the core network comprises a packet switched network.

12. The system of claim 7, wherein the group call data is transmitted from the access node to the wireless device and a second wireless device in communication with the access node over a physical shared downlink channel.

13. A method for paging group call wireless device participants, the method comprising:
   receiving a request to establish a group call with a plurality of wireless device participants;
   providing a group call identification and group call service area for the requested group call;
   instructing one or more access nodes to broadcast a paging message that comprises at least the group call identification, wherein at least two of the plurality of participant wireless devices respond to the paging message based on subscription data stored at each wireless device that comprises the group call identification.

14. The method of claim 13, wherein the instructing one or more access nodes to broadcast the paging message further comprises instructing a plurality of access nodes defined by the service area for the group call to broadcast the paging message.

15. The method of claim 13, wherein the one or more access nodes broadcast the paging message according to a paging frame and paging occasion based on the group call identification.

16. The method of claim 13, further comprising:
   joining the at least two participant wireless devices on the group call based on their responses to the paging message, wherein the at least two participant wireless devices establish an active connection to one of the access nodes instructed to broadcast the group paging message.

17. The method of claim 16, further comprising:
   transmitting downlink group call data from the one access node to the at least two participant wireless devices, wherein the downlink group call data is received from a core network over a multicast data bearer associated with the group call.

* * * * *